Figure 1:
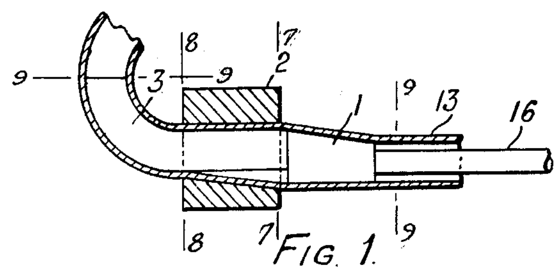

March 28, 1961 J. MacKAY FERGUSON 2,976,908

METHOD OF AND APPARATUS FOR MANUFACTURING PIPE BENDS

Filed May 14, 1957 2 Sheets-Sheet 1

Inventor
James Mac K. Ferguson
By
Pennie, Edmonds, Morton, Barrows & Taylor
Attorneys

METHOD OF AND APPARATUS FOR MANUFACTURING PIPE BENDS

Filed May 14, 1957 2 Sheets-Sheet 2

Inventor
James Mackay Ferguson
By
Pennie, Edmonds, Morton, Barrows & Taylor
Attorneys United States Patent Office 2,976,908

Patented Mar. 28, 1961

1

2,976,908

METHOD OF AND APPARATUS FOR MANUFACTURING PIPE BENDS

James MacKay Ferguson, Hirta Buchanan Drive, Bearsden, Scotland

Filed May 14, 1957, Ser. No. 659,001

9 Claims. (Cl. 153—32)

The subject of this invention is a method of, and apparatus for, manufacturing pipe bends, especially bends of short radius.

When a length of straight pipe is bent, the fibres of the pipe the same distance from the axis of curvature of the bend as the neutral axis of the pipe are subjected to a pure bending force, while the fibres of the pipe a shorter distance from the axis of curvature than the neutral axis are subjected to a bending and a compressive force, and the fibres of the pipe a greater distance from the axis of curvature than the neutral axis are subjected to a bending and a tensile force. The result is that the wall thickness increases at the inside of the bend and decreases at the outside of the bend.

It has been previously known to make pipe bends of a desired diameter and wall thickness which is more or less constant at all parts of the circumference by expanding and bending lengths of straight pipe of a diameter less than the desired diameter, and of a wall thickness greater than the desired wall thickness, the radius of curvature of the pipe bend being so related to the dimensions of the expanding mandrel and to the diameter and wall thickness of the straight pipe that the fibres of the pipe on the same side of the neutral axis as the axis of curvature of the bend are expanded circumferentially by an amount sufficiently exceeding the amount by which said material is longitudinally compressed during bending to cause the wall thickness to be reduced to the desired dimension, and the fibres of the pipe on the side of the neutral axis remote from the axis of curvature of the bend are expanded longitudinally by virtue of the lengthening of the pipe at the outside during bending by an amount sufficient to cause the wall thickness to be reduced to the desired dimension.

The above described process suffers from the drawback that to produce a bend of standardised dimensions the straight pipes frequently should have a diameter and a wall thickness which are not standardised dimensions.

In addition, since all the work done on the metal of the pipe is expanding work the metal of the pipe is stretched to such an extent that it is sometimes found difficult to form pipe bends from straight lengths of pipe having longitudinal brazed or welded seams.

It is an object of the present invention to produce from straight line pipe, bends having a diameter and a wall thickness the same as, or closely approximating to, the respective dimension of the line pipe.

A method of manufacturing pipe bends according to the present invention consists in subjecting a length of straight pipe to radial compressing, radial expanding, and bending operations, the radial pressure during the compressing operation being non-uniform and varying from a maximum value along the line where the plane containing the axis of the bend intersects the exterior surface of the pipe at the outside of the bend to a minimum value along the line where said plane intersects the exterior surface of the pipe at the inside of the bend, and the radial pressure during the expanding operation being

2 non-uniform and varying from a maximum value along the line where the plane containing the axis of the bend intersects the interior surface of the pipe at the inside of the bend to a minimum value along the line where said plane intersects the interior surface of the pipe at the outside of the bend, the amount of compression at any point on the pipe produced by the compressing operation being so related to the amount of expansion and longitudinal compression at the same point on the pipe produced by the expanding and bending operations that the wall thickness of the finished bend is substantially the same as the wall thickness of the straight pipe.

In performing the process the fibres of the pipe on the same side of the neutral axis as the axis of curvature of the bend are expanded in the radial expanding operation and compressed longitudinally in the bending operation by substantially equal amounts, and the fibres of the pipe on the side of the neutral axis remote from the axis of curvature of the pipe are compressed in the radial compressing operation and expanded in the expanding and bending operations by substantially equal amounts.

The three operations may be performed consecutively in the order, expanding, compressing, bending, or they may be performed consecutively in the order, compressing, expanding, bending. Alternatively the compressing and the bending operations may be performed simultaneously, or the expanding and the bending operations may be performed simultaneously.

Pipe bends having walls consisting of several plies of metal may be made by compressing and expanding radially and bending several pipes simultaneously, the pipes being disposed one within the other. The plies may be of different material, e.g., the innermost ply may be of nickel or other corrosion-resisting metal, and the outer ply or plies may be of mild steel.

The pipe may be subjected to the expanding, compressing and bending operations while cold, or may be heated during or before all or selected operations.

Figure 2:
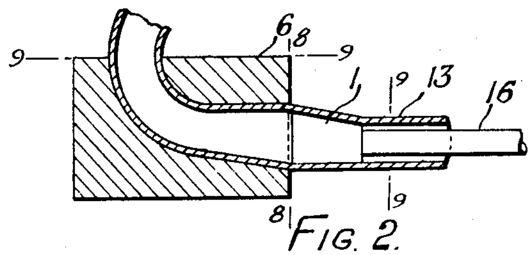
Figure 3:
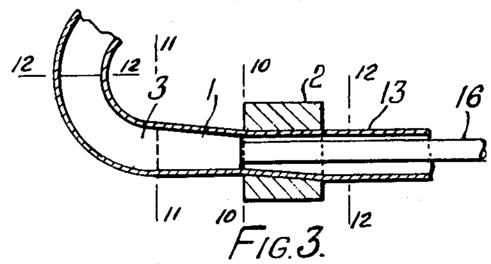
Figure 4:
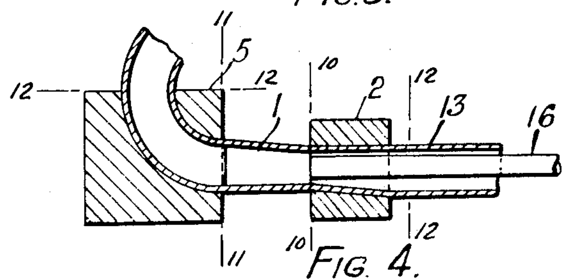
Figure 5:
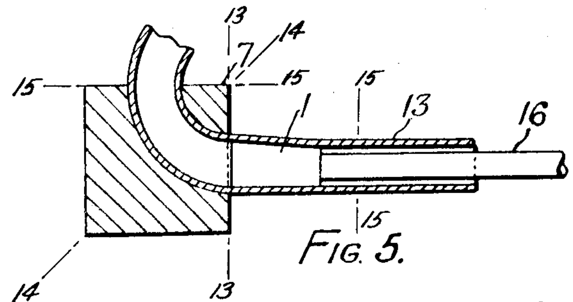
Figure 6:
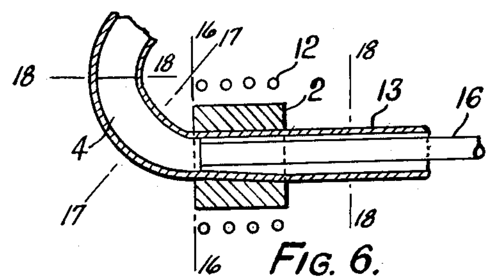
Figure 7:
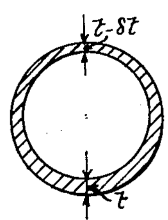
Figure 8:
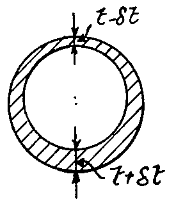
Figure 9:
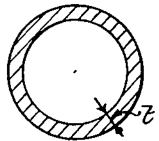
Figure 10:
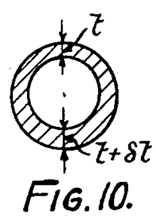
Figure 11:
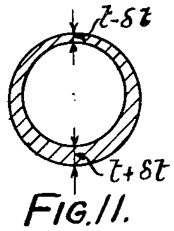
Figure 12:
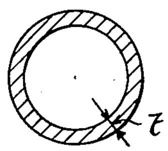
Figure 13:
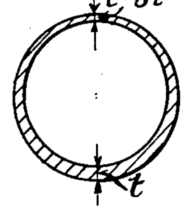
Figure 14:
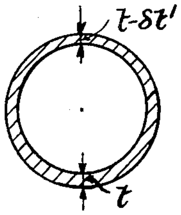
Figure 15:
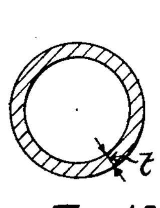
Figure 16:
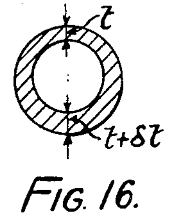

Practical embodiments of the invention are illustrated in the accompanying diagrammatic drawings in which Fig. 1 illustrates an arrangement for performing the process in the order expanding, compressing, bending utilising a mandrel for performing the bending operation; Fig. 2 illustrates an arrangement for performing the process in the same order as in Fig. 1, but utilising a die formed with a curved passage for performing the bending operation, the compressing die and the bending die being integral with one another; Fig. 3 illustrates an arrangement for performing the process in the order compressing, expanding, bending utilising a mandrel for performing the bending operation, the mandrels for performing the expanding and bending operations being integral with one another; Fig. 4 illustrates an arrangement for performing the process in the same order as in Fig. 3, but utilising a die formed with a curved passage for performing the bending operation; Fig. 5 illustrates an arrangement for so performing the process that the compressing and bending operations are performed simultaneously and includes a die formed with a curved converging passage; Fig. 6 illustrates an arrangement for so performing the process that the expanding and bending operations are performed simultaneously, the die in this arrangement being heated by high frequency induction means; and Figs. 7 to 18, inclusive, are transverse sectional views of the pipe, on a larger scale, illustrating the changes in wall thickness of the pipe in the various stages of the operations; Figs. 7, 8 and 9 being taken respectively on the lines 7—7, 8—8 and 9—9, respectively, in Figs. 1 and 2; Figs. 10, 11 and 12 being taken respectively on the lines 10—10, 11—11 and 12—12, respectively, in Figs. 3 and 4; Figs. 13, 14 and 15 being taken respectively on the lines 13—13, 14—14 and 15—15 in Fig. 5; and Figs. 16, 17 and 18 being taken on the lines 16—16, 17—17 and 18—18 in Fig. 6. For simplicity the sectional views of Figs. 7 to 18 illustrate only the pipes undergoing the process.

In the drawings 1 denotes a mandrel of the form of a frustum of an oblique cone, 2 denotes a die formed with a straight converging passage, 3 denotes a curved mandrel of constant diameter in cross section, 4 denotes a curved mandrel of increasing diameter in cross section, 5 denotes a die formed with a curved passage of constant diameter for performing the bending operation, 6 denotes a die formed with a straight converging passage merging into a curved passage of constant diameter, being virtually the dies 2 and 5 combined, 7 denotes a die formed with a curved converging passage for performing the compressing and the bending operations simultaneously. In Fig. 6, 12 denotes the work coil of a high frequency induction heating means for heating the die 2. In Figs. 1 to 6, 13 denotes pipe being subjected to the process. 16 denotes a mandrel bar for holding the mandrel 1, or 1 and 3, or 4.

Figure 17:
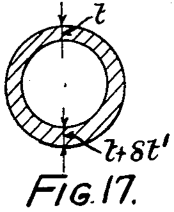
Figure 18:
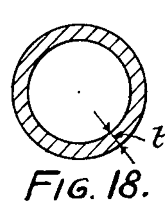

In Figs. 7 to 18, $t$ denotes the standard wall thickness of a pipe before and after bending, $\delta t$ denotes the increment by which the wall thickness $t$ has increased or decreased at the end of a compressing or expanding operation, respectively, and, additionally in Figs. 14 and 17, $\delta t'$ denotes the increment by which the wall thickness $t$ has increased or decreased at an intermediate stage in the compressing or expanding operation respectively.

In practice, where the operations are performed consecutively in the order, expanding, compressing, bending (Figs. 1, 2, 7, 8 and 9), or consecutively in the order compressing, expanding, bending (Figs. 3, 4, 10, 11 and 12), the expanding action over the mandrel causes the material of the pipe 13 to be stretched and to decrease in thickness, the magnitude of the decrease at any point on the circumference of the pipe being proportional to the amount by which the pipe is expanded at that point, the pipe remaining circular in cross section. The compressing operation in the die 2 or 6 causes the material of the pipe to be compressed and increased in thickness, the magnitude of the increase at any point on the circumference of the pipe being proportional to the amount by which the pipe is compressed at that point, the pipe 16 remaining circular in cross section. Since the maximum expanding pressure and the maximum compressing pressure are applied at points on the pipe wall diametrally opposite one another, the thickest and the thinnest parts of the wall are diametrally opposite one another. The result is a circular pipe in which the axis of the bore is displaced from the axis of the outer surface of the pipe. In bending the compressed and expanded pipe over the mandrel 3, or in the die 6 or 5 the thickest portion is positioned at the outside of the bend. The action of bending the pipe causes the thickened portion of the wall, i.e., the portion on the side of the neutral axis of the bend remote from the axis of curvature of the bend to be expanded and become thinner, and the portion of the wall, which has been reduced in thickness, i.e., the portion on the same side of the neutral axis of the bend as the axis of curvature of the bend to be compressed and become thicker, the amount by which the pipe wall is compressed i.e., thickened, or expanded i.e., made thinner at any point after the initial expanding and compressing operations being equal or substantially equal to the amount by which the pipe wall at the same point is made thinner or thickened, respectively, during the bending operation so that the thickness of the wall at all points on the finished pipe bend is the same, or substantially the same as that of the straight pipe.

Where the compressing and the bending operations are performed simultaneously (Fig. 5, 13, 14 and 15), the expanding operation is performed over the mandrel 1 first, the expanding action causing the material of the pipe 13 to decrease in thickness, the magnitude of the decrease at any point on the circumference of the pipe being proportional to the amount by which the pipe is expanded at that point, and being greatest at the point of maximum pressure, the pipe wall at the diametrally opposite point (which will be the outside of the bend) being substantially the same as it was before the commencement of the expanding operation. During the combined compressing and bending operations in the die 7, the compression and consequent thickening of the pipe wall at any point on the bend resulting from the radial compressing operation is wholly or mainly counteracted by the tendency of the pipe wall to become thinner at points on the side of the neutral axis of the bend remote from the axis of curvature of the bend as the metal of the pipe expands and stretches longitudinally during the bending operation, or augmented as the metal of the pipe on the same side of the neutral axis of the bend as the axis of curvature of the bend is compressed and increased in thickness, the algebraic sum of all the increases and decreases of thickness at any point during all the operations being zero or substantially zero so that the thickness of the wall at all points on the finished pipe bend is the same or substantially the same as that of the straight pipe.

Where the expanding and the bending operations are performed simultaneously (Figs. 6, 16, 17 and 18) the compressing operation is performed first in the die 2, the material of the pipe being compressed and increasing in thickness, the magnitude of the increase at any point on the circumference of the pipe being proportional to the amount by which the pipe is compressed at that point, the thickness of the pipe wall at the diametrally opposite point being substantially the same as it was before the commencement of the compressing operation. During the combined expanding and bending operations over the mandrel 4, the expansion and consequent thinning of the pipe wall at any point resulting from the radial expanding operation is wholly or mainly counteracted by the tendency of the pipe wall to become thicker at points on the same side of the neutral axis of the bend as the axis of curvature of the bend as the metal of the pipe is compressed longitudinally during the bending operation or augmented as the metal of the pipe on the side of the neutral axis of the bend remote from the axis of curvature of the bend is stretched and decreased in thickness, the algebraic sum of all the increases and decreases of thickness at any point during all the operations being zero or substantially zero so that the thickness of the wall at all points on the finished pipe bend is the same or substantially the same as that of the straight pipe. In the arrangement illustrated in Fig. 6 the die is heated by high frequency induction from the coil 12 through which alternating current of high frequency is passed.

The process above described is applicable to solid drawn pipes in any ductile material and also to welded or brazed pipes having a longitudinal join, the pipe being preferably so positioned that the maximum radial compressing pressure is applied at the join. The strength of the pipe wall at the join is thus maintained during the whole process at a value not less than its original value, and there is no tendency for the join to open.

What is claimed is:

1. A method of manufacturing pipe bends including the operations of separately radially compressing and expanding eccentrically a pipe section by substantially equal amounts to increase the wall thickness at one side and reduce the wall thickness at the side diametrally opposite while restoring substantially the original diameter of the pipe section, and bending the pipe to shorten the expanded side and lengthen the compressed side whereby to store substantially the original wall thickness.

2. A method of manufacturing pipe bends including the operations of radially expanding eccentrically a pipe section to reduce the wall thickness at one side of the pipe without materially changing the wall thickness at the side diametrally opposite, and simultaneously bending and radially compressing eccentrically the expanded pipe section, the amount of radial expansion being substantially equal to the amount of radial compression whereby to restore substantially the original diameter of the pipe section while the bending action shortens the expanded side to restore substantially the original wall thickness and lengthens the side being compressed whereby to maintain substantially the original wall thickness.

3. A method of manufacturing pipe bends including the operations of radially compressing eccentrically a pipe section to increase the wall thickness at one side without materially changing the wall thickness at the side diametrally opposite, and simultaneously bending and expanding eccentrically the compressed pipe section, the amount of radial expansion being substantially equal to the amount of radial compression whereby to restore substantially the original diameter of the pipe section while the bending action lengthens the compressed side to restore substantially the original wall thickness and shortens the side being expanded whereby to maintain substantially the original wall thickness.

4. Apparatus for manufacturing pipe bends from pipe sections, comprising the combination of a die formed with an oblique conical passage for eccentrically compressing a pipe section, a mandrel of the form of a frustum of an oblique cone for expanding the pipe section eccentrically, the axes of the passage and of the mandrel being substantially parallel, and a curved mandrel of constant diameter for bending the pipe section.

5. Apparatus for manufacturing pipe bends from pipe sections, comprising the combination of a die formed with an oblique conical passage for eccentrically compressing a pipe section, a mandrel of the form of a frustum of an oblique cone for expanding the pipe section eccentrically, the axes of the passage and of the mandrel being substantially parallel, and a second die formed with a curved passage of constant diameter for bending the pipe section.

6. Apparatus for manufacturing pipe bends from pipe sections, comprising the combination of a mandrel in the form of a frustum of an oblique cone for expanding a pipe section eccentrically and a die formed with a curved converging passage so formed that the portion of the wall of said passage which has the greatest radius of curvature is of constant radius of curvature, said die being effective to bend and simultaneously radially compress eccentrically the pipe section.

7. Apparatus for manufacturing pipe bends from pipe sections, comprising the combination of a die formed with an oblique conical passage for compressing a pipe section and a curved mandrel at least a portion of which increases progressively in diameter, the portion of the wall of said mandrel which has the greatest radius of curvature being of constant radius of curvature, said mandrel being effective to bend and simultaneously radially expand eccentrically the pipe section.

8. A method of manufacturing pipe bends comprising reducing eccentrically the diameter of a pipe section by applying to the pipe section a non-uniform radial compressing pressure having a maximum value at one position on the pipe section, increasing eccentrically the diameter of the pipe section by applying to the pipe section a non-uniform radial expanding pressure having a maximum value at one position on the pipe section, the respective positions at which the maximum compressing and expanding pressures are applied being diametrally opposite one another and the amounts by which the diameter of the pipe section is reduced and increased being substantially equal, and bending the pipe section, the position at which the maximum expanding pressure is applied being at the inside of the bend and the radius of bending measured to the neutral axis of the finished bend being proportional to the amounts by which the diameter of the pipe section is reduced and increased, whereby the wall thickness of the finished bend is substantially the same as that of the original pipe section.

9. Apparatus for manufacturing pipe bends from pipe sections comprising the combination of compressing means for reducing eccentrically the diameter of a pipe section, said means being adapted to apply to the pipe section a non-uniform radial compressive pressure which has a maximum value at one position on the pipe section, expanding means for increasing eccentrically the diameter of the pipe section, said expanding means being adapted to apply to the pipe section a non-uniform radial expanding pressure which has a maximum value at one position on the pipe section, the compressing means and the expanding means being so contrived that the respective positions on the pipe section at which the maximum compressing and expanding pressures are applied are diametrally opposite one another and the amounts by which the diameter of the pipe section is reduced and increased being substantially equal, and bending means for bending the pipe section, the position at which the maximum expanding pressure is applied being at the inside of the bend and the radius of bending measured to the neutral axis of the finished bend being proportional to the amounts by which the diameter of the pipe section is reduced and increased, whereby the wall thickness of the finished bend is substantially the same as that of the original pipe section.

References Cited in the file of this patent

UNITED STATES PATENTS

| | | |
|---|---|---|
| 1,353,714 | Bohling | Sept. 21, 1920 |
| 1,872,384 | Andren | Aug. 16, 1932 |
| 1,943,700 | Snell | Jan. 16, 1934 |
| 1,956,604 | Williams | May 1, 1934 |
| 1,996,838 | Snell | Apr. 9, 1935 |
| 2,105,075 | Fritsch | Jan. 11, 1938 |
| 2,435,904 | Robaus | Feb. 10, 1948 |
| 2,485,534 | Mayne et al. | Oct. 18, 1949 |

FOREIGN PATENTS

| | | |
|---|---|---|
| 292,863 | Switzerland | Nov. 16, 1953 |
| 570,251 | Germany | Feb. 13, 1933 |